JOHN B. WIGHTMAN.
Improvement in Measuring-Pails.
No. 114,894. Patented May 16, 1871.
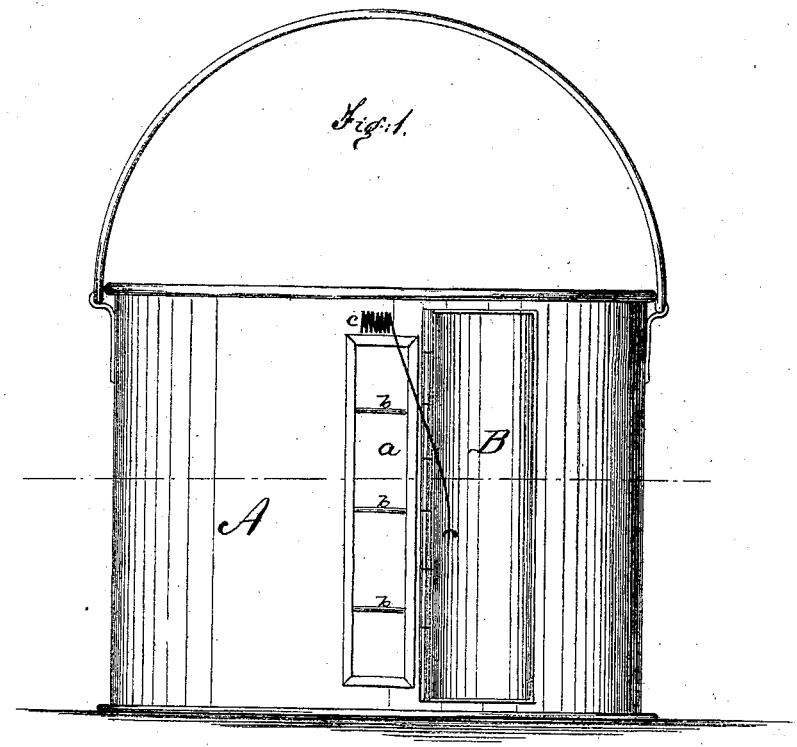
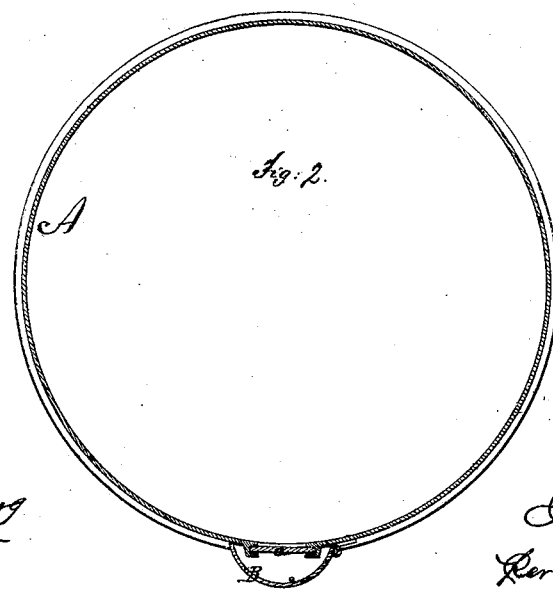
Witnesses:
H. L. Wattenberg
Rufus Hoyt
Inventor:
John B. Wightman
Per G. M. Plympton
Atty

United States Patent Office.

JOHN B. WIGHTMAN, OF BROOKLYN, NEW YORK.

Letters Patent No. 114,894, dated May 16, 1871.

IMPROVEMENT IN MEASURING-PAILS.

The Schedule referred to in these Letters Patent and making part of the same.

*To all whom it may concern:*

Be it known that I, JOHN B. WIGHTMAN, of the city of Brooklyn, county of Kings and State of New York, have invented a new and useful Improvement in Pails, Cans, &c.; and I do hereby declare that the following is a full and exact description of the same, reference being had to the accompanying drawing and to the letters of reference marked thereon making a part of this specification.

My invention consists in a pail, can, or other like vessel, having a measuring device, composed of glass or equivalent transparent material, inserted in an opening in the side of the vessel, and provided with a close hinged cover for the measuring device applied at the side thereof, in connection with a spring arranged to keep the cover in either an open or closed position, as hereinafter more fully described.

I am aware that a measuring device of the kind herein described is not new in itself, such having been applied to cups specially used for measuring; but, by my invention, vessels in general use, as milk-pails and the like, are so adapted that the ordinary measures become unnecessary.

To prevent the injury of the measuring device, to which it would be very liable if the vessel were in common use, (especially in milking,) a close cover is hinged at the side of the glass, and a spring is provided which holds the cover in either an open or closed position.

This spring forms a very important feature in the pail, as it serves to keep the glass protected, and also to hold the cover in open position for any length of time, when desired.

In the accompanying drawing—

Figure 1 represents a front view of a pail with my invention applied thereto, and Figure 2 a cross-section of same in the line $x\,x$, fig. 1.

Similar letters of reference indicate corresponding parts in the drawing.

A represents a pail, of any desired size or construction, a strip of metal being cut from the side.

The opening thus made is filled with a strip of glass or other transparent material, $a$, fitted tightly in any convenient way to the side of the pail or can, so that when this pail or can has any liquid or other substance within it the height of the liquid will readily show through the glass.

In order to determine the quantity of liquid in the pail or can, bars or wires $b\,b\,b$ are secured across the glass at right angles to its length, the spaces between the bars being so adjusted as that each one will correctly mark the quantity of contents in the pail; as, for instance, the lowest one may represent gills; the next one, pints; and the third one, quarts, &c.

To prevent the measuring device or gauge from being broken or otherwise receiving injury, I affix to it, by a hinge, a cover or guard, B, so that said cover will readily close over or open from the gauge; and to keep said cover in either the closed or open position I provide it with a spring, $c$, so constructed as to produce this result with certainty and facility.

Having thus described my invention,

What I claim as new, and desire to secure by Letters Patent, is—

A pail or can, A, having the measuring device $a\,b$ protected by a close cover, B, hinged at the side of the glass, in connection with the spring $c$, arranged as shown, and operating to keep the cover in either an open or closed position, substantially as described.

JOHN B. WIGHTMAN.

Witnesses:
H. L. WATTENBERG,
RUFUS HOYT.